United States Patent [19]
Calvert et al.

[11] 3,814,057
[45] June 4, 1974

[54] SEPARATOR FOR NEGATIVELY PHOTOTACTIC HOUSE FLY LARVAE FROM CHICKEN HEN EXCRETA

[75] Inventors: Corlette C. Calvert, Laurel; Neal O. Morgan, Silver Spring, both of Md.; Richard D. Martin, Tucson, Ariz.

[73] Assignee: The United States of America as represented by the Secretary of Agriculture, Washington, D.C.

[22] Filed: July 28, 1972

[21] Appl. No.: 276,208

Related U.S. Application Data

[62] Division of Ser. No. 113,470, Feb. 8, 1971, Pat. No. 3,716,371.

[52] U.S. Cl. .................................................... 119/15
[51] Int. Cl. ............................................. A01k 29/00
[58] Field of Search ................................... 119/15.1

[56] References Cited
UNITED STATES PATENTS

2,527,214   10/1950   Graves .................... 119/15 X
3,654,903   4/1972   Montgomery ................ 119/15

*Primary Examiner*—Hugh R. Chamblee
*Attorney, Agent, or Firm*—R. Hoffman; W. Bier; W. E. Scott

[57] ABSTRACT

An apparatus for separating negatively phototactic house fly larvae from chicken hen excreta and collecting the larvae to allow them to pupate comprised of two compartments, an upper one having a screened floor and a lower one having a solid floor, a screened tray fitted into the lower compartment and a source of white light. Chicken hen excreta in the upper compartment is seeded with house fly eggs, the eggs are allowed to hatch and the larvae to tunnel and aerate the manure, thus deodorizing and reducing the moisture content of the manure by more than 50 percent. The larvae migrate out of the manure and pupate in the lower compartment. When dried and ground the pupae can be used as a protein source for growing chicks.

2 Claims, 2 Drawing Figures

SEPARATOR FOR NEGATIVELY PHOTOTACTIC HOUSE FLY LARVAE FROM CHICKEN HEN EXCRETA

This is a division of application Ser. No. 113,470 filed Feb. 8, 1971 now U.S. Pat. No. 3,716,371, issued Feb. 13, 1973.

A non-exclusive, irrevocable, royalty-free license in the invention herein described, throughout the world for all purposes of the United States Government, with the power to grant sublicenses for such purposes, is hereby granted to the Government of the United States of America.

This invention relates to an apparatus for separating negatively phototactic house fly (*Musca domestica* L.) larvae from chicken hen excreta and for providing a chamber for the subsequent pupation of the larvae. This invention also relates to a method of removing water and odor from chicken hen excreta and to producing a fertilizer or soil conditioner from the excreta. The invention further relates to a method of producing a quality protein product from fly pupae.

The house fly referred to in the following specifications and claims is *Musca domestica* L. The life cycle of this house fly has the following sequence: adult female → egg → larva → pupa → adult fly. The average time from egg to newly emerged adult fly is approximately 11 to 12 days at temperatures of 74° to 80° F. This invention utilized about 7 days of the life cycle, from egg to pupa. The larvae of the house fly are negatively phototactic, that is, the larvae are repelled by white light from any source. Although only chicken hen excreta, fecal material from caged laying hens, is used in this invention, it seems feasible that the apparatus and process could be applied with equal success to excreta from other avian species such as young growing chickens, turkeys, ducks, geese and quail.

Estimates from experts in the poultry industry indicate that the annual production of poultry excreta is between 40 and 50 million tons. In addition to creating an enormous disposal problem, this amount of excreta creates odor problems and problems associated with air pollution, water pollution, laws and regulations regarding the transportation of raw excreta and encroaching suburbia. Disposal of accumulated excreta can also be very costly for the poultry producer.

For many years poultry excreta has been disposed of by using it as fertilizer. At present, however, with the cities expanding into the suburbs and more and more suburban areas being developed, odors associated with this means of disposal have brought problems with the suburban residents and with motel and resort hotel owners. In addition, the fertilizer value of poultry excreta is not competitive with commercially available chemical fertilizers. Incineration of poultry excreta is also used as a means of disposal, but is not satisfactory because of cost and the resultant air pollution. Dehydration is also used to reduce the excreta to 25 to 30 percent of the original amount but this reduced amount is still a disposal problem. In addition, wetting of the dehydrated material reproduces the original odor and disposal problem. Composting is used successfully in small operations, but would be impossible when thousands of tons of excreta are involved. Lagoons, under or near the chicken house, are satisfactory if constructed properly and if local environmental conditions are suitable. In extremely cold or dry areas, lagoons are generally not satisfactory. Since most of these systems rely on anerobic bacterial digestion, odors can be an extremely difficult problem. Also, if the system is not properly designed, water pollution can be a problem. Another method of disposal is anerobic digestion in sealed tanks. This method has been used to produce methane gas for heating purposes, but costs are prohibitive making the approach impractical for use on a large scale.

The apparatus and process of the present invention are superior to any apparatus or process currently in use for a number of reasons. The daily accumulation of poultry excreta can be processed to obtain a product that is odorless, and since, once processed, the odor will not return, it may be used in bulk as a fertilizer or soil conditioner or it may, after additional drying, be pelleted for such use. Also, the processed material may be used in any area, suburban or otherwise, without creating a fly problem, because after one generation of house fly larvae has been grown in the excreta, subsequent house fly larvae will not develop in it. Another reason for the superiority of this invention is the fact that a quality protein product can be made from the house fly pupae. This product is a nutritious feed supplement for chicks and laying hens. The house fly pupae, after drying and grinding, contain about 63 percent protein, and have been used successfully to replace soybean meal protein in the diet of growing chicks. It is estimated that the daily excreta from 100,000 laying chickens would produce between 500 and 1,000 pounds of pupae. Another favorable aspect of this invention is that the process is completed within 7 or 8 days with odor elimination occurring within the first 3 days. The odor is mostly ammonia and, if so desired, could be recovered as another by-product of the process.

An object of this invention is to provide an apparatus having a chamber in which negatively phototactic house fly larvae can be separated from chicken hen excreta, and having a second chamber in which the larvae pupate.

Another object is to provide an apparatus in which odor can be quickly and efficiently removed from chicken hen excreta.

Still another object is to provide an apparatus in which chicken hen excreta can be quickly and efficiently converted to a non-odoriferous fertilizer or soil conditioner.

A still further object of this invention is to provide the poultry producer with a means of disposing of large quantities of chicken hen excreta without polluting the environment.

Still another object is to use house fly larvae to convert poultry excreta to a useful, nonodoriferous product, separate the larvae from the converted excreta, allow the larvae to pupate and then process the pupae to a quality protein product.

According to this invention the foregoing objects are accomplished by an apparatus comprised of two compartments, an upper one which has a screened bottom and is divided into a relatively large center section and two narrow side sections while the lower compartment is not sectioned and has a solid bottom, a screened tray and a source of white light. The screened tray fits in the lower compartment which is provided with a support means to keep the tray parallel to and at a predetermined distance from the solid floor of the compartment. While operating, the center section of the upper compartment contains the chicken hen excreta and the compartment is mounted on the lower compartment. The two narrow side sections allow ammonia to escape from the lower compartment.

Referring to the drawings.

Figure 1:
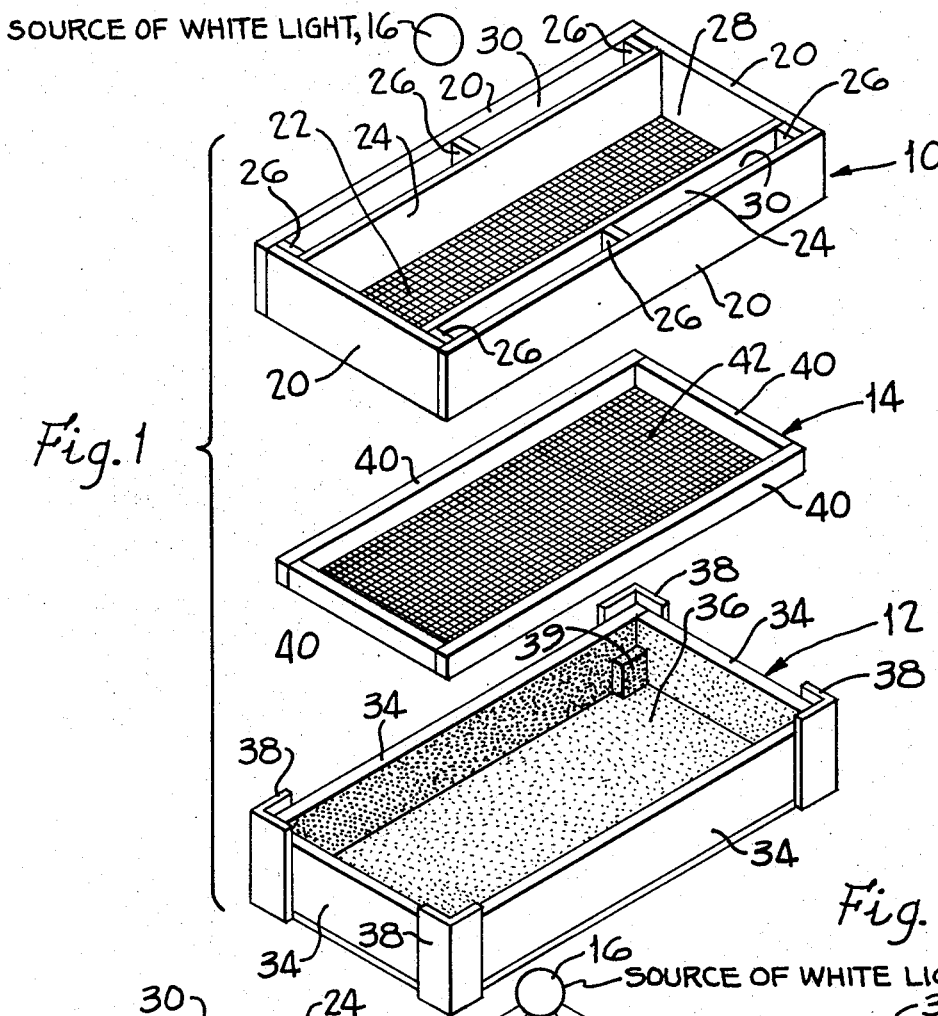
FIG. 1 is an exploded isometric view of the major components of this apparatus.

The apparatus consists of two compartments, an upper one 10, and a lower or base member 12, a screened tray 14 and a source of white light 16. The upper compartment 10 comprises side and end walls 20 and a floor 22 made of 1/8 inch mesh screen preferably of a corrosion resistant variety. Spaced inwardly from two opposite side walls 20 are a pair of parallel partitions 24. They are held in fixed position by a plurality of spacers 26. Thus the upper compartment is divided into a relatively large center area 28 and two narrow side portions 30 which serve as vent ducts.

Figure 2:
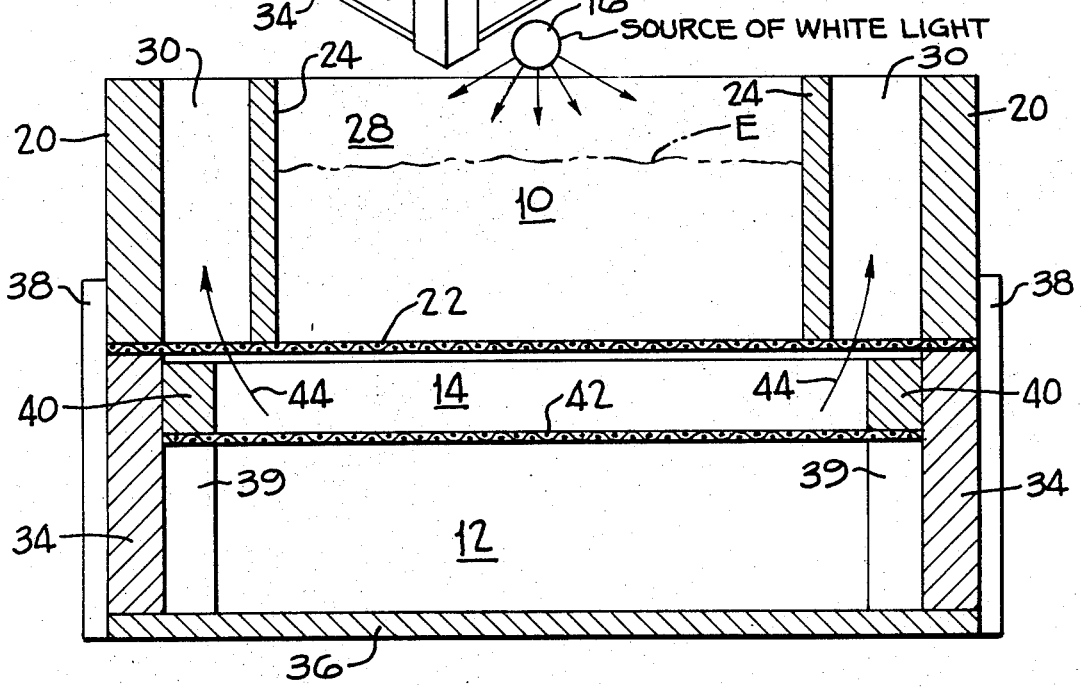
FIG. 2 is a cross sectional view of the components assembled in operating relationship.

The lower compartment 12 comprises side and end walls 34 having a solid floor 36. The length and width of this compartment is identical with that of compartment 10 so that when assembled one above the other they are in alignment, as seen in FIG. 2. To facilitate assembly and maintain alignment corner flanges 38 may be provided. To support tray 14 corner members 39 are provided and the entire inner surfaces of compartment 12 are painted black as suggested by the stippling in FIG. 1. The tray 14 has side and end members 40 having outside dimensions corresponding to the inside dimentions of compartment 12 so that it may be assembled telescopically within compartment 12 as seen in FIG. 2. The bottom of tray 14 is one-sixteenth inch mesh screen 42 preferably made of plastic coated fiberglass.

As shown in FIG. 2, chicken hen excreta E is placed in the center area 28 of the top box to a depth of 2½ to 3 inches. Then newly laid house fly (*Musca domestica* L.) eggs are seeded onto the excreta at a rate of 3 eggs per gram of excreta, and the assembled device is placed in a room with a continuous overhead light source 16 and an air temperature of 70° to 80° F where it is kept for 7-8 days. During this time the fly eggs hatch and the larvae tunnel and aerate the excreta. By the 6th day most of the larvae have passed through the one-eighth inch mesh screen to the tray below. The continuous overhead light prevents the negatively phototactic fly larvae from moving upwards in search of a pupation site. Some particles of excreta drop through the one-eighth inch mesh screen 22 with the larvae to the fiberglass screen 42. However, screen 42 is sufficiently flexible to allow the larvae to wriggle through and drop to the solid floor 36 of the lower compartment 12 to pupate while allowing very little, if any, of the excreta to pass through.

Gas generated in the process passes upward through ducts 30 in upper compartment 10 as indicated by arrows 44. It is mostly ammonia and may be drawn off as an additional by-product or vented to atmosphere.

For the purposes of demonstrating the utility of this invention, one-eighth inch galvanized hardware cloth was used for screen 22. However, other materials such as stainless steel can also be used. It is essential that screen 42 is made of a material that will allow a larva to pass through. Plastic coated fiberglass is such a material.

Feeding tests in which the fly pupae meal was substituted for soybean meal in a chick starting ration showed that the dried fly pupae provided protein of sufficient quality to support normal growth of chicks during the first two weeks of life.

At a seeding rate of three house fly eggs per gram of excreta, the odor of the manure was reduced to an unobjectionable level by the fourth day and by the eight day, the manure was essentially odorless and friable and had lost 56 percent of its original moisture.

We claim:

1. An apparatus for separating negatively phototactic house fly (*Musca domestica* L.) larvae from chicken hen excreta and collecting the larvae comprising:
   a. an upper member having a meshed screen floor with a large central section for holding excreta and seeding it with house fly eggs and smaller uncovered peripheral sections for venting purposes;
   b. a lower member for collecting the larvae, said member being provided with a solid floor and with means for supporting in a nesting fashion the aforesaid upper member;
   c. a meshed screen tray for preventing excreta from dropping to the floor of the lower member, said tray fitting telescopically within said lower member and being removably supported parallel to and above the floor of said lower member; and
   d. a source of white light located above the upper member.

2. The apparatus of claim 1 wherein the meshed screen floor of the upper member is one-eighth inch galvanized hardware cloth and the meshed screen tray is one-sixteenth inch plaster coated fiberglass.

* * * * *